(12) United States Patent
Chermon et al.

(10) Patent No.: US 12,425,123 B2
(45) Date of Patent: Sep. 23, 2025

(54) DISRUPTION TO AN OPERATION OF AN UNMANNED AERIAL VEHICLE

(71) Applicant: D-FEND SOLUTIONS AD LTD., Raanana (IL)

(72) Inventors: Assaf Monsa Chermon, Kfar Yedida (IL); Nadav Arie, Tel Aviv (IL); Roy Kedmi, Raanana (IL); Ohad Moshe Abarbanel, Tel Aviv (IL); Hanan Leizerovich, Petah Tikva (IL); Yariv Speiser Barzelai, Tel Aviv (IL); Yaron Bebes, Petech Tikva (IL); Yosef Meir, Petach Tikva (IL)

(73) Assignee: D-FEND SOLUTIONS AD LTD., Raanana (IL)

( * ) Notice: Subject to any disclaimer, the term of this patent is extended or adjusted under 35 U.S.C. 154(b) by 1079 days.

(21) Appl. No.: 17/444,907

(22) Filed: Aug. 11, 2021

(65) Prior Publication Data

US 2024/0356669 A1 Oct. 24, 2024

(51) Int. Cl.
*B64C 39/02* (2023.01)
*F41H 11/02* (2006.01)
*H04K 3/00* (2006.01)
*B64U 10/13* (2023.01)
*B64U 101/30* (2023.01)
*B64U 101/64* (2023.01)

(52) U.S. Cl.
CPC .............. *H04K 3/92* (2013.01); *H04K 3/65* (2013.01); *B64U 10/13* (2023.01); *B64U 2101/30* (2023.01); *B64U 2101/64* (2023.01)

(58) Field of Classification Search
None
See application file for complete search history.

(56) References Cited

U.S. PATENT DOCUMENTS

| | | | |
|---|---|---|---|
| 6,339,396 | B1 | 1/2002 | Mayersak |
| 9,524,648 | B1 * | 12/2016 | Gopalakrishnan ...... G06F 21/00 |
| 9,529,360 | B1 * | 12/2016 | Melamed ............ F41H 13/0093 |
| 9,689,976 | B2 | 6/2017 | Parker et al. |
| 9,715,009 | B1 | 7/2017 | Parker et al. |
| 9,870,566 | B2 * | 1/2018 | Gong ....................... G08G 5/59 |
| 9,977,117 | B2 | 5/2018 | Parker et al. |
| 10,156,631 | B2 | 12/2018 | Parker et al. |
| 10,281,570 | B2 | 5/2019 | Parker et al. |
| 10,399,674 | B2 | 9/2019 | Goodrich |
| 10,431,102 | B2 * | 10/2019 | Clark ....................... G08G 5/22 |
| 10,521,598 | B2 | 12/2019 | Hofleitner et al. |
| 10,588,021 | B2 * | 3/2020 | Shattil ................. H04L 27/0012 |
| 10,670,696 | B2 | 6/2020 | Parker et al. |

(Continued)

FOREIGN PATENT DOCUMENTS

| | | |
|---|---|---|
| WO | 2018217261 A2 | 11/2018 |
| WO | 2020065454 A1 | 4/2020 |

*Primary Examiner* — Tuan A Tran
(74) *Attorney, Agent, or Firm* — Reches Patents (57) ABSTRACT

There may be provided a method for inducing a disruption to an operation of an unmanned aerial vehicle (UAV) that communicates with a remote controller, said method may include determining to induce the disruption to the operation of the UAV; and transmitting, to the UAV, one or more disrupting commands that once executed by the at UAV causes a unit of the UAV to malfunction, the malfunction induces the disruption to the operation of the UAV.

17 Claims, 8 Drawing Sheets

(56) References Cited

U.S. PATENT DOCUMENTS

| | | | |
|---|---|---|---|
| 10,739,451 B1 | 8/2020 | Parker et al. | |
| 10,760,879 B2 * | 9/2020 | Stark | F41H 13/0093 |
| 10,795,010 B2 | 10/2020 | Parker et al. | |
| 10,866,597 B1 * | 12/2020 | Reinhold | G05D 1/0027 |
| 10,907,940 B1 | 2/2021 | Parker et al. | |
| 10,993,120 B1 * | 4/2021 | Lekutai | H04B 17/29 |
| 11,035,929 B2 | 6/2021 | Parker et al. | |
| 11,074,822 B2 * | 7/2021 | Ziemba | G08G 5/34 |
| 11,094,202 B2 * | 8/2021 | Gong | G08G 5/57 |
| 11,156,707 B2 * | 10/2021 | Parker | G05D 1/0022 |
| 11,193,738 B1 * | 12/2021 | Schultheis | F41H 11/02 |
| 11,233,978 B1 * | 1/2022 | Morrow | G06V 20/13 |
| 11,307,291 B1 * | 4/2022 | Aljohani | G01S 5/0294 |
| 11,488,385 B2 * | 11/2022 | Morrow | G06V 20/13 |
| 11,679,894 B1 * | 6/2023 | Chinoy | G08G 5/58 |
| | | | 701/2 |
| 11,745,871 B2 * | 9/2023 | Kim | H04W 12/122 |
| | | | 701/3 |
| 11,757,561 B2 * | 9/2023 | Whittaker | F41H 13/0006 |
| | | | 89/36.16 |
| 12,022,289 B2 * | 6/2024 | Fox | H04W 12/04 |
| 12,033,524 B2 * | 7/2024 | Jordan | G08G 5/26 |
| 12,055,368 B2 * | 8/2024 | Hyman | F41H 11/02 |
| 12,067,885 B2 * | 8/2024 | Gong | G08G 5/57 |
| 12,092,756 B1 * | 9/2024 | Parker | F41H 13/0075 |
| 12,153,430 B2 * | 11/2024 | Michini | G08G 5/59 |
| 2017/0094527 A1 | 3/2017 | Shattil et al. | |
| 2018/0065745 A1 | 3/2018 | Bash et al. | |
| 2018/0069650 A1 | 3/2018 | Tran et al. | |
| 2018/0227073 A1 | 8/2018 | Hetsko et al. | |
| 2020/0272827 A1 | 8/2020 | Morrow et al. | |
| 2021/0197967 A1 * | 7/2021 | Song | H04K 3/43 |

\* cited by examiner

FIG. 1

Determining to induce a disruption to an operation of a drone 210

Transmitting, to a recipient selected out of the drone and the authorized entity, one or more disrupting commands that once executed by recipient causes a unit of the recipient to malfunction. The malfunction induces the disruption to the operation of the drone 220

Transmitting one or more first disrupting commands to the drone and transmitting one or more second disrupting commands to the authorized entity 222

Determining to induce a disruption to an operation of a drone 310 transmitting, to the drone, one or more disrupting commands that once executed by the drone causes a unit of the drone to operate in a manner that complies with an operational mode of the drone that differs from the current operational mode 320

Determining to induce a disruption to an operation of a drone 410

Transmitting, to the drone, one or more disrupting commands that once processed by the drone causes the drone to communicate with an unauthorized entity 420

Determining to induce a disruption to an operation of a drone 510

Transmitting, over the communication link multiple superfluous messages related to access control of the communication link thereby disrupting the communication over the communication link 520

DISRUPTION TO AN OPERATION OF AN UNMANNED AERIAL VEHICLE

BACKGROUND

The popularity of commercial Unmanned Aerial Vehicles (UAVs) is growing rapidly. By year 2020, over one hundred million UAVs are expected to be in use. Until a few years ago, UAVs were purely military aircrafts. Today, commercial UAVs are widely available, relatively inexpensive, and feature top-notch military-grade capabilities.

While most UAVs are used for legitimate and positive purposes, many are used irresponsibly or maliciously—risking aircrafts in airports, smuggling drugs and weapons into prisons, attacking or harassing political figures, and carrying-out terror acts.

Military counter-UAV technologies, usually based on radar detection, narrow beam RF jamming, or kinetic mitigation (missiles, destructive laser beams) have been deployed successfully in offshore military installations and rural environments.

However, in various scenarios (even in military scenarios) these technologies are not suitable. For example—these technologies may not be suitable for urban environments or airports due to various risks, including but not limited to collateral damage.

There is a growing need to provide an efficient method for disruption to an operation of a UAV.

SUMMARY

There may be provided systems, methods, and computer readable medium as illustrated in the specification.

There may be provided a method for disruption to an operation of a UAV.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a method, a system, and a computer readable medium for.

A UAV may be programmed and/or otherwise configured to complete a task and/or a mission. This may include arriving to a destination and/or performing an operation when arriving to the destination. A UAV may also be regarded as arriving to the destination when the destination is in reach of the UAV. The destination is in reach of the UAV when the UAV is positioned at a location that enables the UAV to complete the task related to the destination.

The operation may include exploding a target associated with the destination, delivering a payload (that may or may not be a damaging payload) to the target, performing an electronic countermeasure, acquire information regarding the target, direct accurate ammunition to the target, and the like.

It should be noted that the UAV may be programmed to perform multiple missions and/or reach multiple destinations and/or perform multiple operations related to one or more targets and/or perform any desired flying pattern and/or fly under the control of a remote controller or other control devices and/or flying without predefined target or goal. For simplicity of explanation, the following text will refer to a target located at a destination, and a UAV assigned with a mission that includes performing an operation regarding the target.

When referring to a "remote controller", this includes, besides a remote controller device, any other controlling device like a ground station, VR goggles, smartphone or tablet, control stick, telemetry module, secondary remote controller (e.g. gimbal controller), and the like.

There may be provided a method for inducing a disruption to an operation of a UAV. The disruption may prevent the UAV from successfully completing the mission.

The disruption to the operation of the UAV may include at least one out of:

Pairing with an unauthorized entity.
Disconnecting the UAV from the remote controller.
Executing a safe plan (or emergency plan) of the UAV.
Returning to a base station or a takeoff location or any other default location of the UAV.
Changing a destination of the UAV.
Changing a flying pattern of the UAV.
Increasing the visibility of the UAV to countermeasures and/or attacks.
Deactivating or hampering any stealth operation or stealth mode of the UAV.
Deactivating or hampering any concealment measure of the UAV.
Stopping a progress of the UAV towards a destiny of the UAV.
Hovering in place for at least a predefined period of time.
Hovering in place until running out of power.
Crash landing the UAV.
Landing the UAV in place
Prevent the UAV from flying into a designated zone ("no fly zone"), temporarily (e.g. passage of a convoy) or permanently (restricted structure)
Prevent the UAV from taking off
Prevent the UAV from ascending above a certain altitude or descending below a certain altitude
Being overtaken by unauthorized entity.
Executing a command even without being paired.
Transmitting information (such as sensed information, status information, debugging information)—especially in scenarios in which the sensed information should not be transmitted, or in which the sensed information would not have been transmitted in the near time frame.
Activating or operating or disabling any of the modules of the UAV without that being initiated by the pilot—for example, releasing a payload of the UAV at a different location than planned by the pilot or preventing the pilot from releasing a payload, or preventing the drone from recording images and the like
[otherwise disrupt separate devices that are carried by the UAV]

As indicated above—more than one disruption of operation may occur. For example—the UAV may first be induced to transmit information and then be induced to crash.

Figure 1:
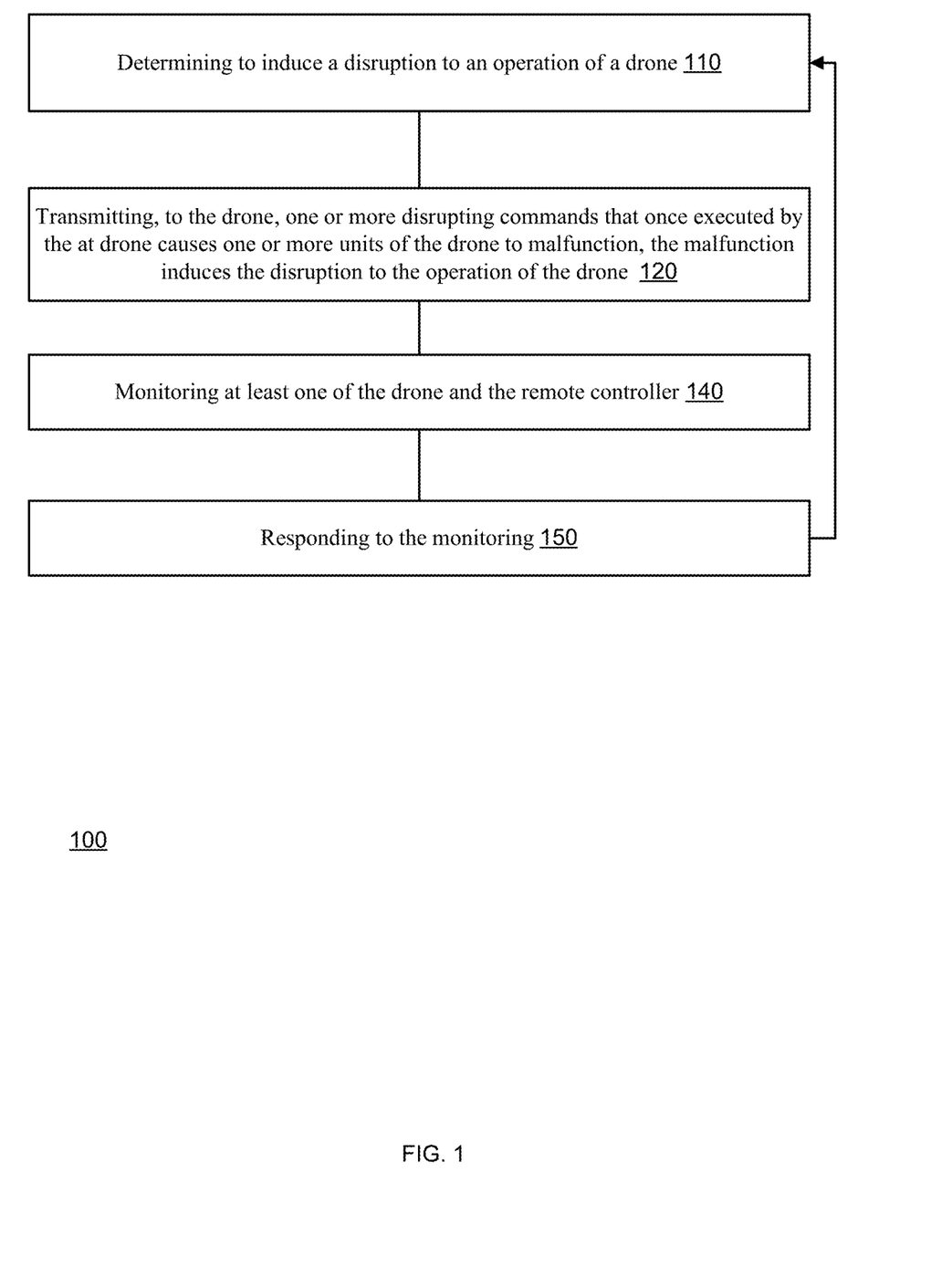
FIG. 1 illustrates an example of a method.

FIG. 1 illustrates method 100 for inducing a disruption to an operation of a UAV that communicates with a remote controller.

Method 100 may start by step 110 of determining to induce a disruption to an operation of a UAV.

Step 110 may be triggered upon a detection of a communication between the UAV and the remote controller.

Step 110 may be triggered by a detection of the UAV. The detection can be made by any sensor or unit—radar, RF sensing unit, acoustic sensor, heat sensor, light sensor, visual sensor, and the like. The sensor may be an active sensor and/or a passive sensor.

Step 110 may be triggered regardless of (even without) at least one out of (a) a detection of the UAV, and (b) a detection of a communication between the UAV and the remote controller.

For example—step 110 may be trigged in a random manner, a pseudo random manner and/or according to one or more rules such as predefined time schedule, or be triggered in response to an event, and the like. The event may include detecting an attempt to jam the system executing method 100.

The detection can be made by any sensor or unit—radar, RF sensing unit, acoustic sensor, heat sensor, light sensor, visual sensor, and the like. The sensor may be an active sensor and/or a passive sensor.

Method 100 may include determining the one or more disrupting commands. This may be included in step 110, in step 120 of method 100, or in another step of method 100.

Step 110 may be followed by step 120 of transmitting, to the UAV, one or more disrupting commands that once executed by the UAV causes one or more units of the UAV to malfunction, the malfunction induces the disruption to the operation of the UAV. The execution by the drone may include an execution by at least one unit of the drone. A unit that executed the one or more disrupting commands may malfunction and/or cause another unit to malfunction.

The one or more units of the UAV may be at least one of a communication unit of the UAV, one or more modems of the UAV, a controller of the UAV, a sensor of the UAV, a power supply unit of the UAV, a telemetry unit of the UAV, a battery module of the UAV, a storage unit of the UAV, an object detection unit of the UAV, a processor of the UAV, or any other unit of the UAV.

The malfunction may include at least one of the following:

A reset of the unit.
A restart of the unit.
Skipping one or more processing steps of the unit.
Skipping one or more authentication steps.
Skipping one or more verification step.
Skipping one or more configuration step.
Skipping one or more initialization step.
Skipping at least one of an encryption step and a decryption step.
Skipping at least one of an error correction decoding step and an error correction encoding step.
Skipping at least one of a scrambling step and a descrambling step.
Changing one or more processing parameters of the unit.
Changing at least one of an encryption parameter and a decryption parameter. For example—changing a password, an encryption key, auxiliary key, handshake key, challenge key, an encryption protocol, and the like.
Changing at least one of an error correction decoding parameter and an error correction encoding parameter.

Changing at least one of a scrambling parameter and a descrambling parameter.

Changing one or more configuration parameters of the unit.

Changing one or more authentication parameters of the unit.

Changing one or more debugging parameters of the unit.

Changing an execution path of the unit.

Changing an operational mode of the unit.

Executing one or more undocumented commands of the unit.

Executing one or more debugging commands.

Executing one or more commands of an operational mode that differs from an operational mode of the UAV when the transmitting occurs.

Turning off the unit.

Slowing an execution speed of a program executed by the unit.

Starting an executing an endless loop of instructions.

Changing one or more communication parameters.

Changing at least one out of frequency channel.

Changing at least one frequency hopping sequence parameter such as but not limited to start or stop of hopping frequency.

Changing the frequency band used

Changing a preamble sequence.

Changing an error correction functionality.

Changing a coding.

Changing a bit rate.

Changing a baud rate.

Changing the power of transmission

Changing a guard interval.

Changing a scrambling sequence.

Changing header bits.

Avoiding from transmitting a response to reception of one or more transmissions from the remote controller of the UAV.

Changing a network address of the remote controller (as seen by the UAV).

Turn off a GPS unit.

Cause the GPS unit to determine a wrong GPS location

Turn off an ADS-B unit

Cause the ADS-B unit to determine a wrong detection or location of an airborne vehicle Short circuit battery or any other unit of the UAV.

Turn off a remote control modem.

Turn off a telemetry modem.

Turn off a vital feature required for flight, such as gyro, motors.

Cause false detection of obstacle.

Cause false detection of a target of a sensor or otherwise cause the sensor to trigger a faulty sensing Cause the battery meter of the UAV to determine a faulty battery level, e.g. determine that the battery is empty, which can trigger an activation of an emergency plan Cause the UAV to transmit information gained by the UAV.

Cause the UAV or its storage module to delete images or video recordings that were captured by the UAV camera Cause the UAV or its storage module to delete flight records or flight history Cause the UAV or its storage module to delete any files or records that are stored in its storage unit or detachable storage Cause the UAV to transmit or otherwise give access to files or records that are stored in its storage unit or detachable storage The one or more disrupting commands may fulfill at least one of the following:

Be configured to exploit a vulnerability of the unit.

May result in a denial of service of the unit.

May be configured to exploit a vulnerability in a communication protocol used by the UAV.

May cause a buffer overflow malfunction.

May cause a halting of the unit.

May cause an occurrence of an exception of an execution of a program executed by the unit.

May cause the UAV to reject packets that may be identified as being sent from the remote controller of the UAV.

May cause the UAV to transmit information from the UAV—in contrary to transmission constraints imposed by the UAV during non-test flight.

May cause the UAV to fail to detect objects sensed by the UAV.

May differ from a disconnect command, may differ from a disconnect command but may induce a malfunction that may be disconnecting the UAV from the remote controller of the UAV.

May cause at least one additional unit of the UAV to malfunction.

May be compliant with any protocol layer used by the UAV.

May be application layer commands.

May be a reset of the unit command or a restart of the unit command.

May cause the UAV to change what seems to the UAV to be the network address of the remote controller.

May cause the UAV to change what seems to the UAV to be the network address of a remote controller to a network address dictated by the one or more disruption commands.

May be determined based on an outcome of one or more previous disruption command transmissions.

May be determined based on a feedback regarding an outcome of one or more previous disruption attempts.

May be determined based on an evaluation of an outcome of a transmission of at least one disruption command.

May be determined based on a knowledge of a root cause of the malfunction of the unit.

May be determined without knowing of a root cause of the malfunction of the unit.

May be determined based on a location of the UAV.

May be determined based on a location of the remote controller.

May be determined based on one or more spatial relationships between two or more out of the UAV, the transmitter and the base station.

May be determined based on an expected reception of the base station signals by the UAV.

May be based on a distance between the remote controller and the UAV.

May be based on a flight pattern of the UAV.

May be spread over the entire spectrum of communication between the UAV and the remote controller.

May spread over a part of said spectrum.

May involve frequency hopping.

May involve scanning the spectrum or a portion of the spectrum.

May follow specific frequencies and time of transmission of specific frequencies used by the UAV and the remote controller.

May follow a frequency band and a time of transmissions of frequencies within the frequency bands used by the by the UAV and the remote controller.

May be transmitted in a continuous manner during one or more periods.

May change over time—for example within one or more time windows in which step 120 is executed.

May be determined in any manner.

May be determined based on previous study of the communication between the UAV and the remote controller.

May be determined based on previous study of vulnerabilities and/or errors or any other aspect of any unit of the UAV.

May be determined based on on-the-fly learning of the communication between the UAV and the remote controller.

May be determined based on a combination of predefined disruption commands that may be adapted overtime based on the success of the disruption commands.

May be encapsulated and/or formatted and/or included in any type of packet, frame, and the like.

Method 100 may include step 140 of monitoring at least one of the UAV and the remote controller.

Step 140 may be executed before the execution of step 110, in parallel to the execution of step 110, following the execution of step 110, before the execution of step 120, in parallel to the execution of step 120, following the execution of step 120, and the like.

For example—the transmission of any disruption command may be followed by detecting the location and/or movement of the UAV.

The monitoring may include searching for communication between the UAV and the remote controller, and/or detecting the UAV (by a visual sensor or by any other type of sensor), and the like.

Step 140 may include, for example, monitoring responses of at least one of the UAV and the remote controller to the transmission of the one or more disrupting commands.

Step 140 may include checking whether the operation of the UAV was disrupted. Step 140 may include searching for any other item—for example searching for responses that may lead to the disruption—for example, a reconnection attempt of the UAV, a temporal disconnection period, and the like.

Step 140 may be followed by step 150 of responding to the monitoring.

Step 150 may include jumping to step 120, suggesting and/or instructing a change in step 120, ending method 100, notifying one or more other systems about the monitoring results and/or about the disruption commands sent during step 120, and the like.

The change in step 120 may include determining at least one disruption command, changing at least one disruption command, removing at least one disruption command, and/or changing a manner of transmission of at least one disruption command.

Figure 2:
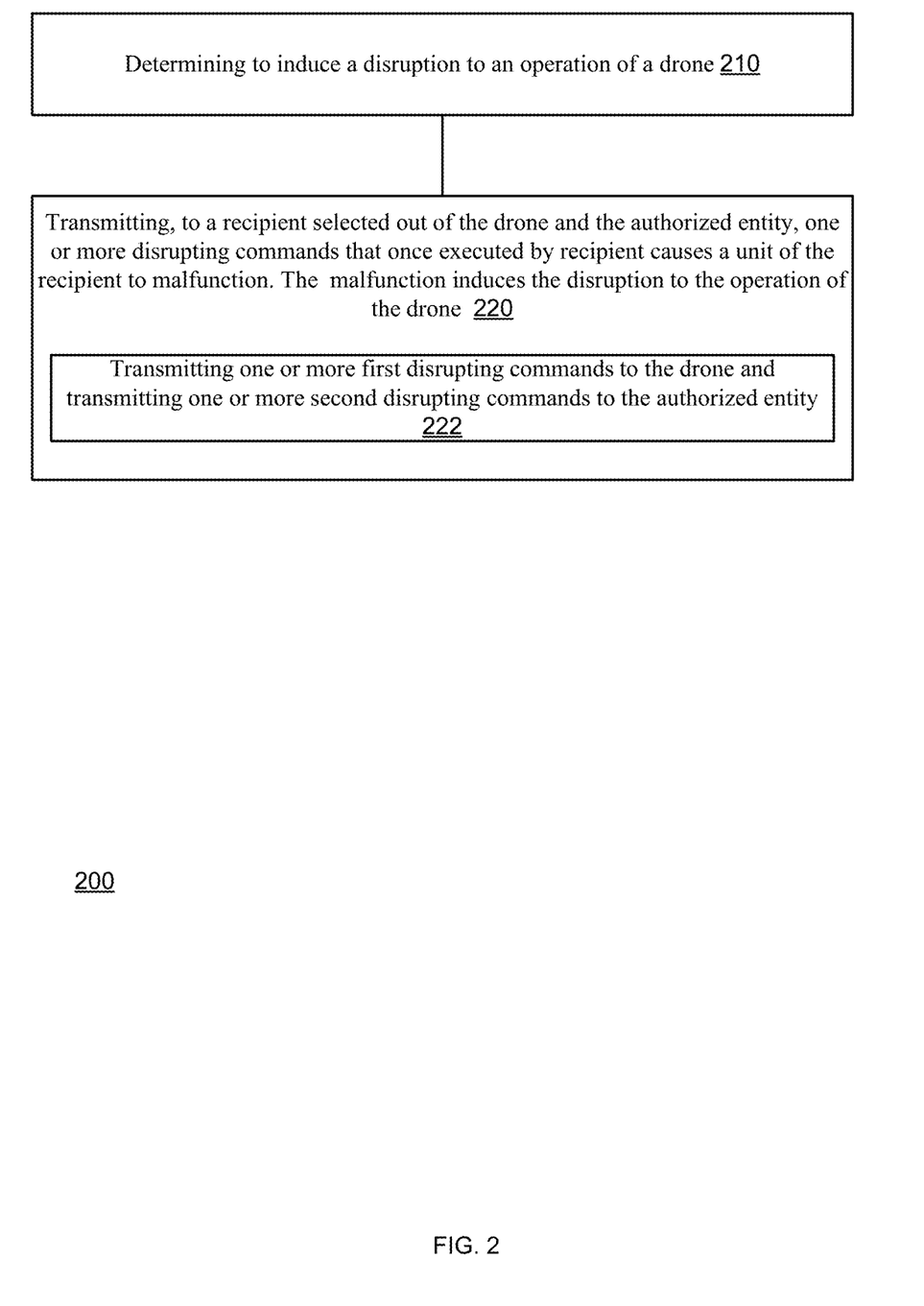
FIG. 2 illustrates an example of a method.

It should be noted that the disruption commands transmitted during step 220 may change over time—for example upon an occurrence of an event, based on a predefined schedule, based on a pseudo random schedule, based on a random process, and the like.

Step 220 may attempt to attack the UAV in various manners—especially when the response of the UAV to the reception of the disruption commands is unknown or hard to predict.

Method 100 illustrates a communication between a UAV and a remote controller and also illustrates transmitting disruption commands that cause a unit of the UAV to malfunction.

It should be noted that the UAV may communicate with an authorized entity that may differ from the remote controller. Additionally or alternatively, the disruption commands may be aimed to the authorized entity (and not to the UAV) or may be aimed to the authorized entity and the UAV. A unit of the authorized entity may be induced to malfunction—in addition to a unit of the UAV or instead of the unit of the UAV.

FIG. 2 illustrates a method 200 for inducing a disruption to an operation of a UAV. The UAV communicates with an authorized entity.

The authorized entity is authorized in the sense that it allowed (at least) to communicate with the UAV and/or may control an aspect of operation of the UAV and/or affect in any other manner the operation of the UAV. The authorization may be a part of the mission. The authorization may be granted prior to the execution of the mission and/or during the mission. The authorization may be granted in various manners—for example by programming the UAV, by abiding with a pairing process, and the like.

The authorized entity may be a remote controller of the UAV, may differ from the remote controller of the UAV, may be another UAV, and the like.

Method 200 may start by step 210 of determining to induce a disruption to an operation of a UAV. Any trigger of step 110 may be applied mutatis mutandis to step 210.

For example—step 210 may be triggered by a detection of a communication between the UAV and the authorized entity. The authorized entity is authorized to communicate with the UAV.

Step 210 may be followed by step 220 of transmitting, to a recipient selected out of the UAV and the authorized entity, one or more disrupting commands that once executed by recipient causes a unit of the recipient to malfunction. The malfunction induces the disruption to the operation of the UAV.

Any malfunction and/or disruption mentioned above (for example in relation to method 100) may be applied mutatis mutandis to step 220. For example—in step 220, the malfunction may be of a unit of the authorized entity.

The malfunction of a unit of the authorized entity may disrupt the operation of the UAV in any manner—for example cause the authorized entity not to communicate with the UAV, send erroneous messages to the UAV, and the like.

The recipient may be the UAV. The recipient may be the authorized entity.

Both the UAV and the authorized entity may be the intended recipients of one or more disruption commands, and the malfunction may occur to one or more units of the UAV, of the authorized entity or of both the UAV and the authorized entity.

Accordingly—step 220 may include transmitting to another recipient of the UAV and to the authorized entity, the one or more disrupting commands, that once executed by the other recipient causes a unit of the other recipient to malfunction, the malfunction also induces the disruption to the operation of the UAV. Thus—if the UAV is the recipient then the authorized entity is the other recipient—and vice-versa.

Step 220 may include step 222 of transmitting one or more first disrupting commands to the UAV and transmitting one or more second disrupting commands to the authorized entity.

At least one first disrupting command may differ from at least one second disrupting command. At least one first disrupting command may equal at least one second disrupting commands. One, some, or all first disrupting commands may be equal to or differ from one, some, or all corresponding second disrupting commands.

At least one first disrupting command may be transmitted, at least once, concurrently to the transmission of at least one second disrupting command. At least one first disrupting command may be transmitted, at least once, in a non-overlapping manner in relation to a transmission or any second disrupting command.

The first disrupting commands and the second disrupting commands may be transmitted at the same manner—or at least in partially different manner. The manner of transmission may include the transmission path, any part of the transmission path, any transmission parameter (including intensity, polarity, frequency, modulation, wave shaping, and the like).

Method 200 may include monitoring at least one of the UAV and the authorized entity and/or may include responding to the monitoring. Any monitoring measure of step 140 of method 100 may be applied mutatis mutandis to the monitoring of method 200. Any response to the monitoring step of step 150 of method 100 may be applied mutatis mutandis to the monitoring of method 200.

Figure 3:
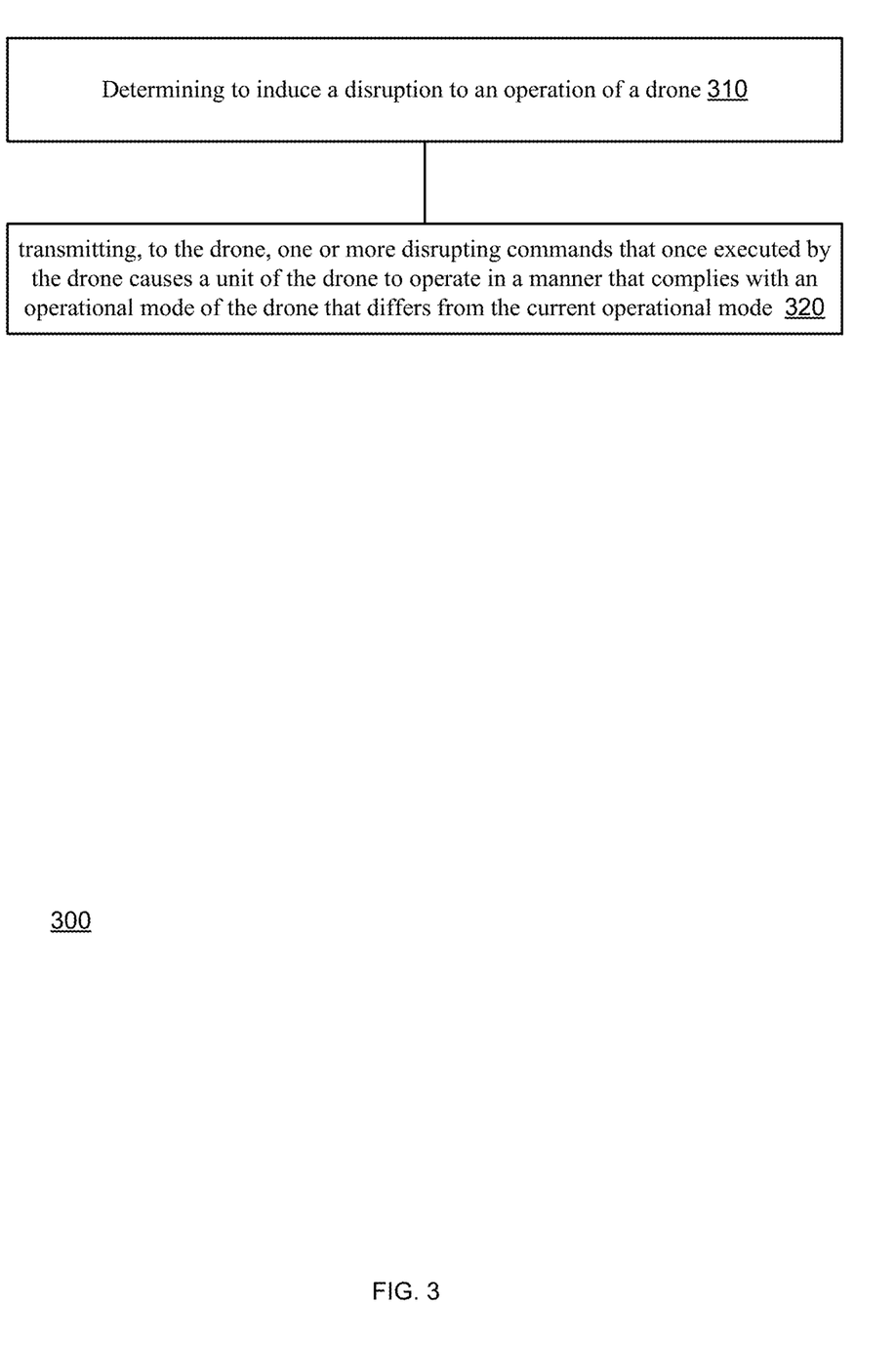
FIG. 3 illustrates an example of a method.

FIG. 3 illustrates a method 300 for inducing a disruption to an operation of a UAV.

Method 300 may start by step 310 of determining to induce the disruption to the operation of the UAV while the UAV operates at a current operational mode.

Any trigger to step 110 may be applied mutatis mutandis to step 310.

Step 310 may be followed by step 320 of transmitting, to the UAV, one or more disrupting commands that once executed by the UAV causes a unit of the UAV to operate in a manner that complies with an operational mode of the UAV that differs from the current operational mode.

For example, the current operational mode may be a stealth mode, the current operational mode may be a silent mode, the current operational mode may differ from a debugging mode, the current operational mode may be differ from a flight mode, the current operational mode may differ from a test mode, and the like.

The goal of step 320 is to have the UAV enter a target operational mode that may differ from a stealth mode, may differ from a silent mode, may be a test mode and/or debug mode. In the target mode the UAV may transmit information (such as status, sensor information, and the like), may be more prone to attacks, may be less secure than the current operational mode, may fly in a manner that is more detectible to sensors, and the like.

Method 300 may include monitoring at least one of the UAV and the remote controller and/or may include responding to the monitoring. Method 300 may include monitoring at least one of the UAV and the authorized entity and/or may include responding to the monitoring. Any monitoring measure of step 140 of method 100 may be applied mutatis mutandis to the monitoring of method 300. Any response to the monitoring step of step 150 of method 100 may be applied mutatis mutandis to the monitoring of method 300.

Figure 4:
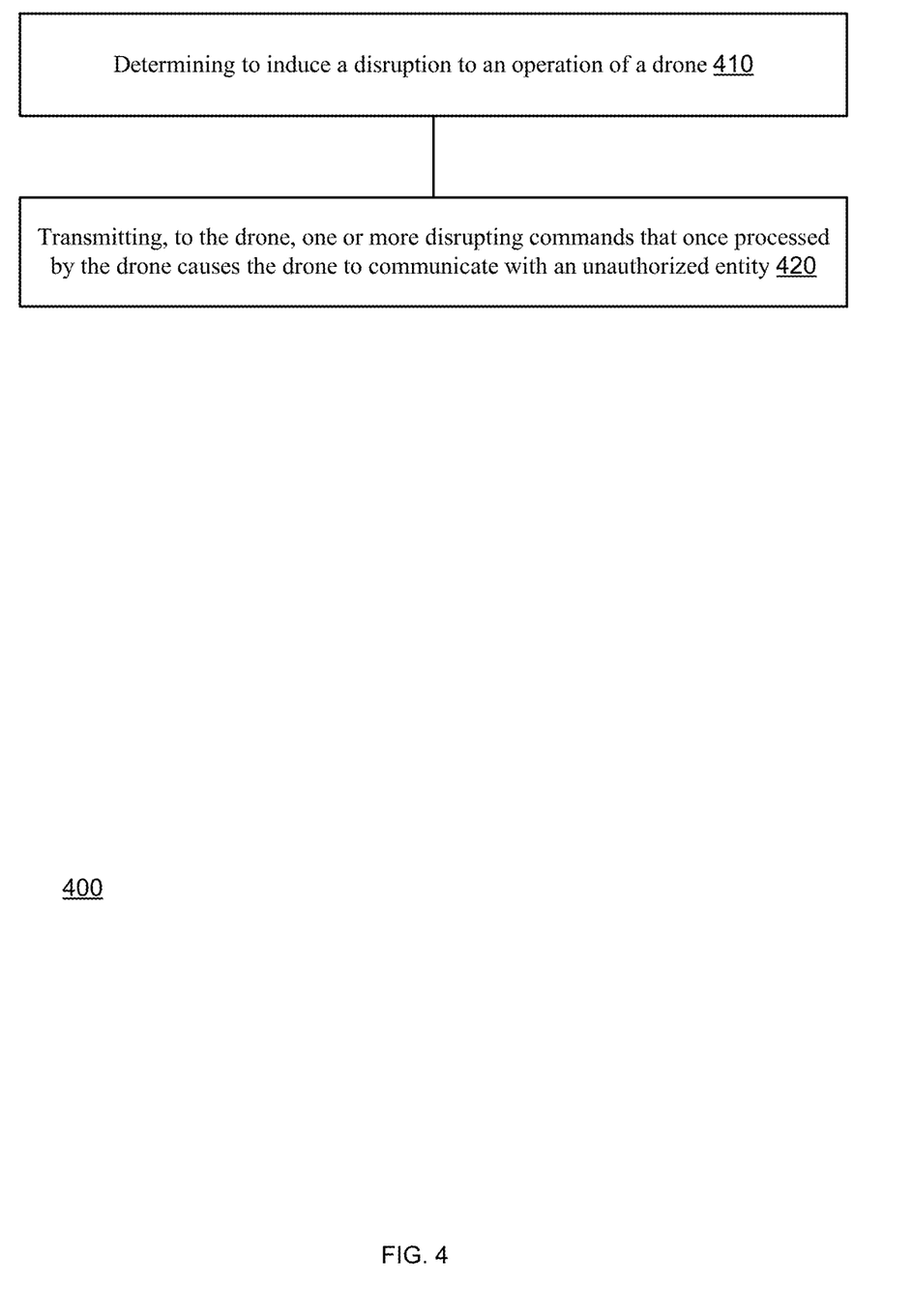
FIG. 4 illustrates an example of a method.

FIG. 4 illustrates a method 400 for inducing a disruption to an operation of a UAV.

Method 400 may start by step 410 of determining to induce the disruption to the operation of the UAV.

Any trigger to step 110 may be applied mutatis mutandis to step 410.

Step 410 may be followed by step 420 of transmitting, to the UAV, one or more disrupting commands that once processed by the UAV causes the UAV to communicate with an unauthorized entity.

This may cause the UAV to be controlled by the unauthorized entity, to be fed with false information and/or instructions from the unauthorized entity, and the like.

Method 400 may include monitoring at least one of the UAV and the remote controller and/or may include responding to the monitoring.

Method 400 may include monitoring at least one of the UAV and the authorized entity and/or may include responding to the monitoring. Any monitoring measure of step 140 of method 100 may be applied mutatis mutandis to the monitoring of method 400. Any response to the monitoring step of step 150 of method 100 may be applied mutatis mutandis to the monitoring of method 400.

There may be provided a method that may cause a UAV to stop sending messages, or to send messages that do not contain vital information, through actively sending disruptive messages into the communication network of the UAV. These disruptive messages may cause the UAV to determine that it is not clear to send packets over the network, or that it is not allowed to send such packets, or will occupy the UAV's resources in a way that will not enable it to process outward communication. The methods described here are applicable in WiFi networks but they can similarly work on other types of networks in case similar commands exist in the protocol of these networks.

Some networks base their division of resources (most notably time division) by means of nodes sending requests notifying the other nodes that they desire to use such resources for a specific measure (e.g. use the channel for a time window).

In some networks, the other nodes respond to such requests by acknowledging it. In some networks, a node that receives such an acknowledgement without first receiving the request would abide by that acknowledgement. This may be manipulated in a way that a node in the network (or many nodes in the network) may be prevented from sending any information out because of lack of resources.

The disruption may include transmitting (for example continuously) request to send (RTS) messages that notify the network (or rather users of the network) on an intention of the node (network member) sending the request to send packets of information through the network. In case a node sends such messages continuously, the other nodes will respond by acknowledging these requests one after the other and as such, will also refrain from transmitting anything through the same network. Continuously transmitting such messages may prevent the nodes from transmitting for a length of time. In case a UAV is prevented from sending packets over a length of time, or a remote controller that is similarly prevented from sending packets over a length of time, it might cause a disconnect between the UAV and the remote controller.

Transmitting (for example continuously transmitting) Clear To Send (CTS) messages that are acknowledging a RTS that was received so that the node which sent the RTS will determine it can indeed use the time resource it requested to transmit its message. In case a node in the network receives such a CTS message, even if it did not receive the original RTS message, it may determine that such RTS message was indeed sent, will accept and abide to the CTS acknowledgement, and will refrain from transmitting during the time period that was acknowledged. In this way, continuously transmitting CTS messages may prevent the nodes from transmitting for a length of time. In case a UAV is prevented from sending packets over a length of time, or a remote controller that is similarly prevented from sending packets over a length of time, it might cause a disconnect between the UAV and the remote controller.

Figure 5:
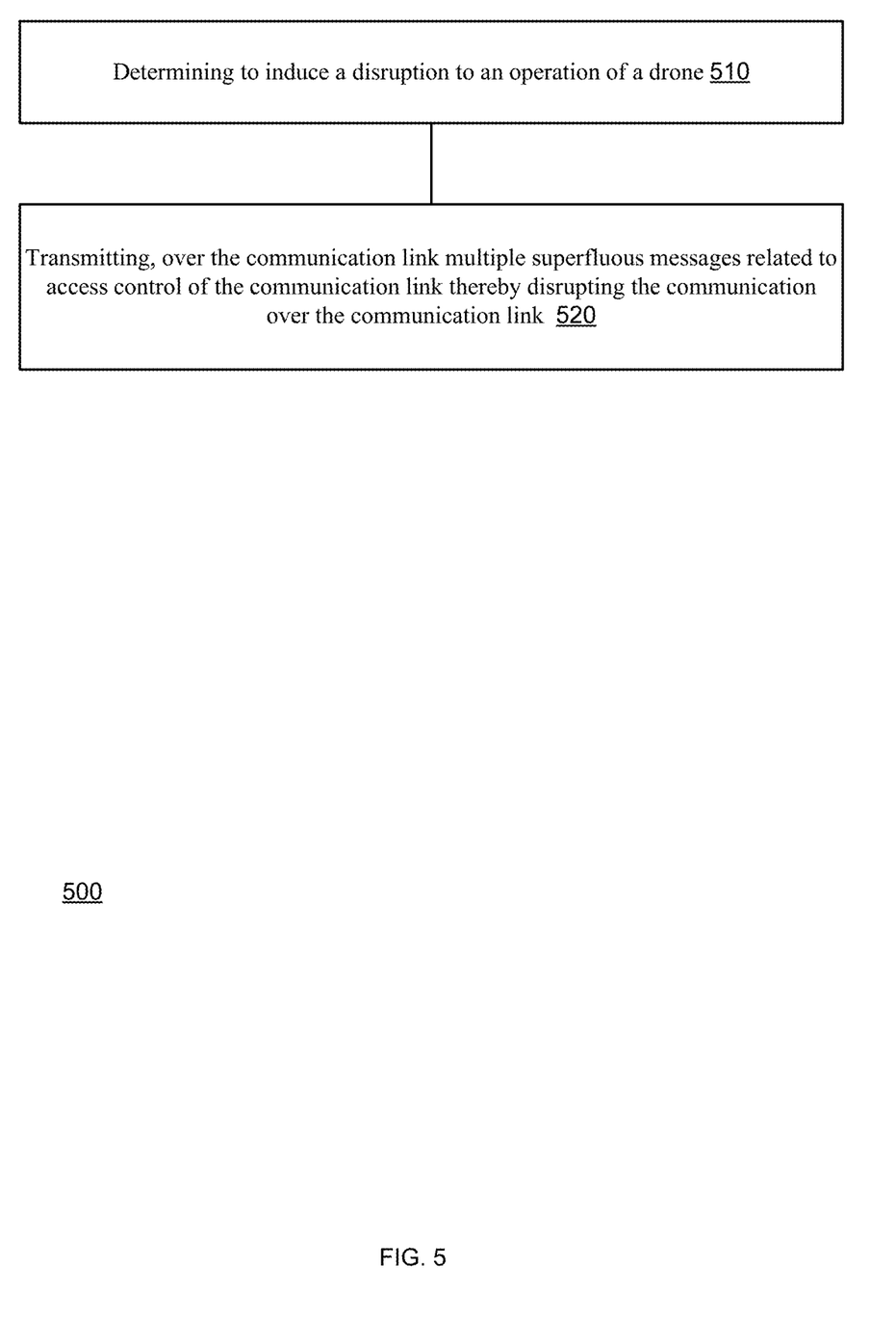
FIG. 5 illustrates an example of a method.

FIG. 5 illustrates a method 500 for disrupting communication over one or more communication links used by a UAV shared by a UAV and one or more other users. Used means having an access to and/or authorized to utilize, and the like.

Method 500 may include step 510 of determining to disrupt communication over a communication link. Any trigger to step 110 may be applied mutatis mutandis to step 510.

Step 510 may be triggered by detecting a communication, over the communication link, between the UAV and another user of the communication link.

Step 510 may be followed by step 520 of transmitting, over the communication link multiple superfluous messages related to access control of the communication link thereby disrupting the communication over the communication link.

Method 500 may include monitoring at least one of the UAV and the remote controller and/or may include responding to the monitoring.

Method 500 may include monitoring at least one of the UAV and the authorized entity and/or may include responding to the monitoring. Any monitoring measure of step 140 of method 100 may be applied mutatis mutandis to the monitoring of method 500. Any response to the monitoring step of step 150 of method 100 may be applied mutatis mutandis to the monitoring of method 500.

In relation to any method of methods 100, 200, 300, 400 and 500—any reference to a transmission of disrupting commands that once executed causes a malfunction of a unit—may be applied mutatis mutandis to the transmission of any other content (for example information) that once processed causes a malfunction of a unit.

Figure 6:
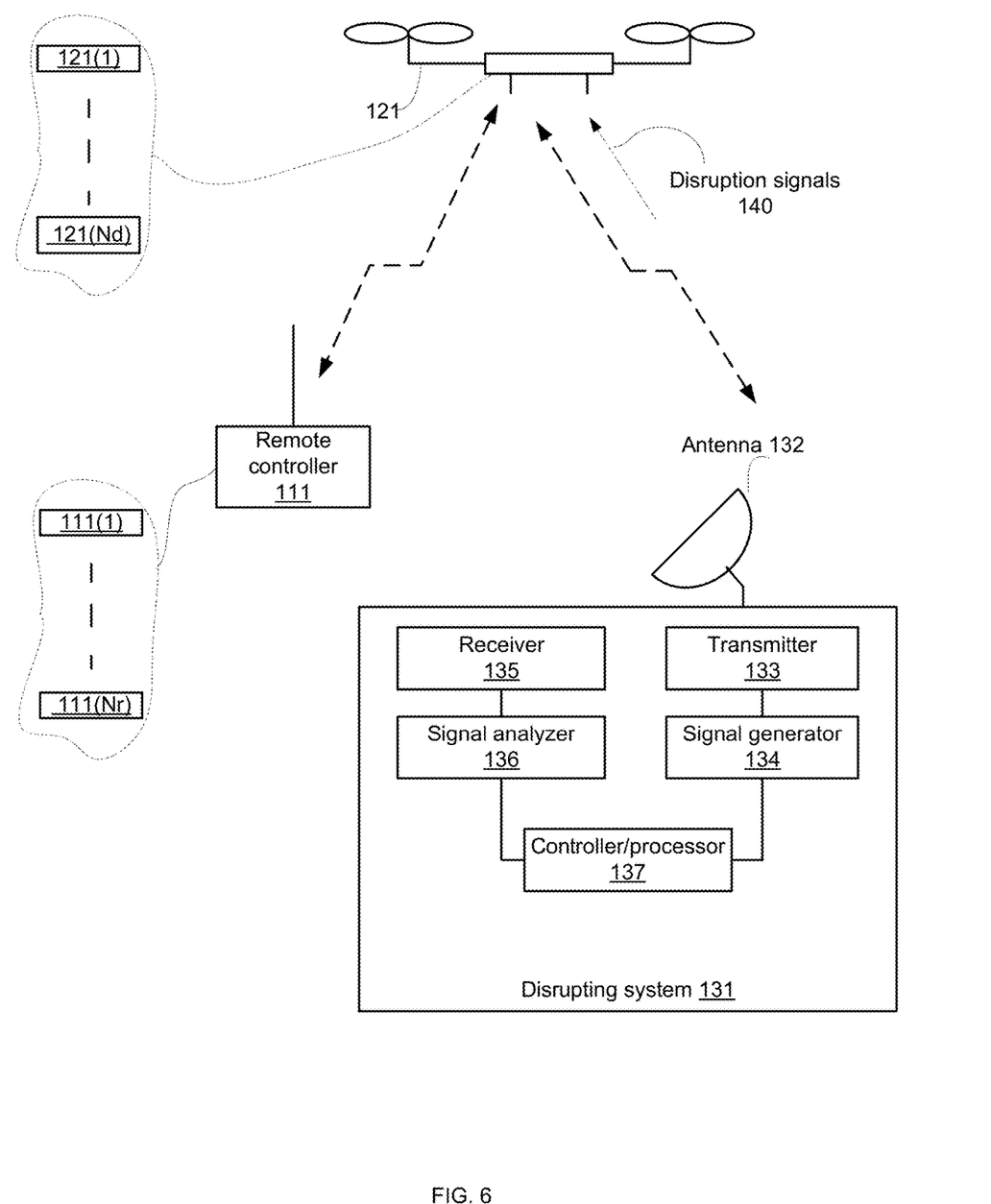
FIG. 6 illustrates an example of a disrupting system, a UAV, and a remote controller.
Figure 7:
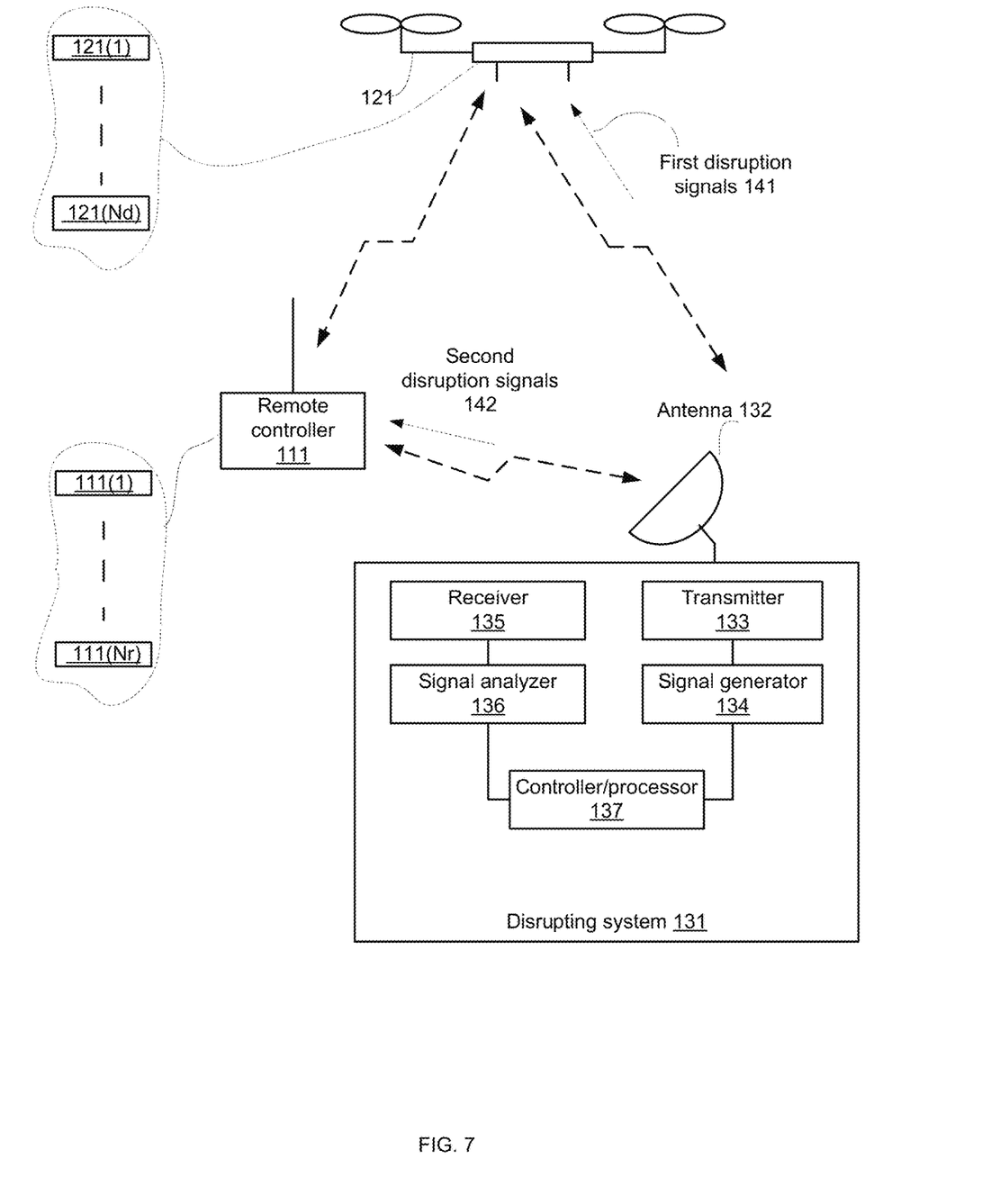
FIG. 7 illustrates an example of a disrupting system, a UAV, and a remote controller.
Figure 8:
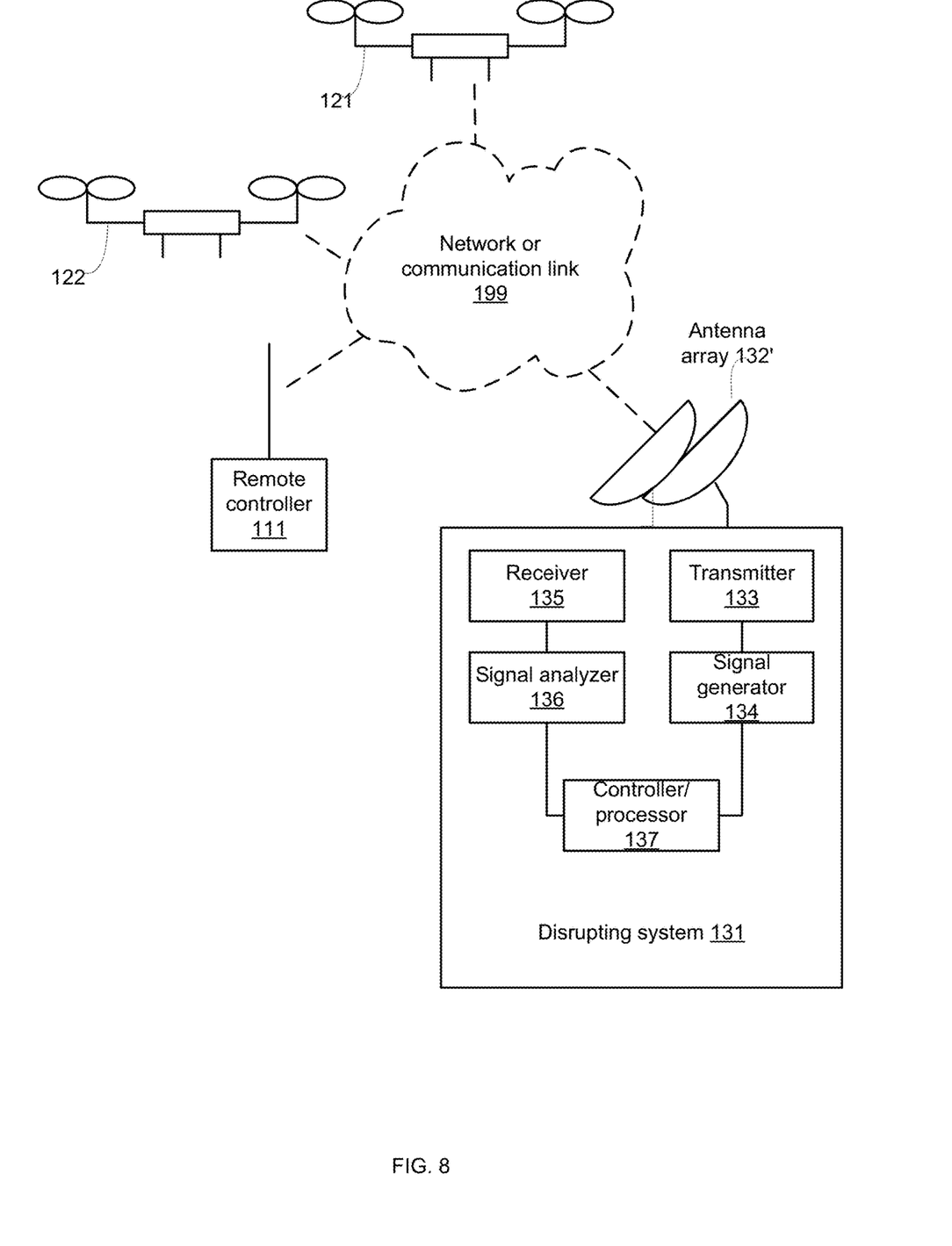
FIG. 8 illustrates an example of users of a communication link or network.

FIGS. 6-8 illustrate different examples of disrupting system 131 that may execute one, some, or all of methods 100, 200, 300, 400 and 500.

FIG. 6 is an example of a disrupting system 131, a UAV 121, and a remote controller 111.

The UAV 121 and the remote controller 111 may communicate over a bi-directional link or any other link—for example two unidirectional links.

The UAV may include a first plurality (Nd) of units 121(1)-121(Nd). The remote controller 111 may include a second plurality (Nr) of units 121(1)-121(Nr).

One of more of the units of the UAV may be attacked, caused to malfunction, assist in attacking another unit, and the like. Examples of units of the UAV are discussed in various parts of the application. One or more of the units of the remote controller may be attacked, caused to malfunction, assist in attacking another unit, and the like.

FIG. 6 also illustrates disruption commands 140 that are sent to the UAV.

The disrupting system 131 is illustrated as including antenna 132, a transmitter 133, a signal generator 134, a receiver 135, a signal analyzer 136 and a controller/processor unit 137.

Antenna 132 may be used for receiving signals transmitted from UAV 121 and/or from the remote controller 111. These signals are sent to receiver 135 that provides detection signals to signal analyzer 136 that may analyze the signals. The analysis may be spectrum analysis, timing analysis, demodulation, descrambling, error correcting, decoding and the like. The signal generator 134 may generate the disruptive signals to be transmitted by transmitter 133 via antenna 132.

It should be noted that the disruption system may have one or more transmission antennas that are separate from one or more reception antennas, The disrupting system 131 may include only part of the units illustrated in figure and/or may include more or other units.

The controller/processor may be a controller and/or a processor. The controller may control the operation of the disrupting system and the processor may receive the analysis of received signals from signal analyzer 136 and determine which disrupting commands to transmit and when to transmit them.

The controller/processor may perform the functionality of the signal analyzer and/or of the signal generator 134.

FIG. 7 is an example of a disrupting system 131, a UAV 121, and a remote controller 111.

FIG. 7 illustrates the disrupting system 131 as sending first disruption signals to the UAV and second disruption signals 142 to the remote controller.

FIG. 8 is an example of a network or communication link 199 shared by users such as a disrupting system 131, a UAV 121, another UAV 122 and a remote controller 111.

In FIG. 8 the disrupting system 131 includes an array of antennas 132 that may include multiple antennas.

There may be provided a system for detection and mitigation of UAVs whereas the system may detect UAV communication, and may generate information by classifying the communication as related to a UAV, determine relevant communication parameters and additional parameters including in some cases the model of the UAV, the type of modem the UAV is using (e.g. which wireless communication component is used), the type of flight controller (computer, operating system), etc.

Said information may be provided through other means like an external command sent to the system with at least some of the information. The information may include knowledge of UAV models stored in a database or library. In some cases, it might also be with some degree of freedom (e.g. it is not known which communication module is used, but the system can attempt to assume each of a list of components it can handle and try them one by one to see if there is any effect resulting).

The system may use various mitigation techniques tailored to UAV. This would involve using UAV specific information and may determine the countermeasure based on UAV specific parameters such as location, altitude, engine load, battery load, flight pattern etc.

The system may cause the WiFi modem of the UAV to reset. Such reset to a WiFi modem, in a general case not related to UAVs, would just cause the modem to go back online after a few seconds, or may cause it to have some trouble reconnecting to the network. In case the WiFi modem is the means of communication of a UAV, such reset may cause the UAV to disconnect from its remote controller which would cause it to initiate the UAV's safe plan which would usually send it to its home location without the remote controller being able to reconnect, or with the UAV pilot having to manually stop this safe plan in order to prevent it from being completed.

The system may transmit disruption content—such as disruption commands that may cause any of the following (or any combination):

(a) Cause the modem to reset, turn off, disconnect client (remote controller) from the communication link, or otherwise malfunction (e.g. go into an infinite loop, stop or halt operations until reset, etc.).

(b) Cause the modem to ignore some of the communication filters it uses to determine which future packets to pass through (e.g. white list, black list).

(c) Cause the modem to skip data processing steps (e.g. disable encryption, disable scrambling).

(d) Cause the main computer/flight controller/remote controller of the UAV to initiate a pairing sequence or otherwise modify pairing parameters like UAV or remote controller identifiers.

(e) Cause the modem or the main computer to change some or all of the communication parameters they are using (e.g. frequency channel, hopping sequence, start/stop hopping frequency, preamble sequence, error correction functionality, coding, bit rate, baud rate, bandwidth, guard interval, scrambling sequence, header bits, etc.).

(f) Cause other components of the UAV to act in a way that would change the control the UAV pilot has on the UAV, or to make the UAV or remote controller transmit information not normally transmitted from them or not in the way it is normally transmitted.

(g) Cause the UAV to activate its emergency plan or alternatively a different emergency plan than the one set by the UAV pilot.

Option (a) can be obtained by transmitting a disruption command embedded in an application layer command. This may include sending disruption content encapsulated in a standard command that causes a reset or disconnect. In some UAV protocols there are commands that may cause such an effect, and sending them in an available time slot, or in a power that will be received by the UAV as stronger than the received power of the UAV's remote controller (due to relative power of transmissions and distances of remote controller and system from the UAV, link-budget), will cause that effect.

Option (a) may be obtained by exploiting a weakness in the protocol in any layer that causes the modem to reset (even if it is because of an unplanned but existing bug).

Option (a) may be obtained by causing the modem or the main computer to block\filter certain communications channels\methods.

Option (a) may be obtained by exploiting a vulnerability in the implementation of the protocol in any layer that causes the modem to reset (even if it is because of an unplanned but existing bug) where reset can mean reset, turn off, or otherwise malfunction (e.g. go into an infinite loop, stop or halt operations until reset, etc.). For example—assuming a WiFi based communication—the disruption may use a set of packets that causes a buffer overflow in one of the standard processes. Some WiFi modems enable to send them a message that contains a payload that contains several fields of data. The fields of data contain field lengths or start addresses that are also transmitted within the packets. If the packets transmitted contain field lengths that are incorrect (e.g. too big), and if the modem is not programmed to properly manage the event of incorrect field length—then the result may cause the modem to access memory addresses that are outside the memory allocated for that packet and try to read from them or write on them. This may cause an exception in the operation of the code and hence cause the modem to crash and possibly reset itself in order to overcome this. This will cause the communication link between the UAV and the remote controller to disconnect and in many cases will prevent them from communicating back. A UAV may then initiate its emergency plan which may cause it to fly back to its takeoff position, land in place, hover in place, or fly to a pre-designated location, all may be considered as a desired outcome for the purpose of protection against attacks by UAVs.

This exploiting a vulnerability may be more reliable if the same packet is sent multiple times until the outcome was achieved; we may check whether the outcome was achieved after such attack, or we may send a pre-set number of times, or over a pre-set length of time, without checking the outcome, both would increase the reliability of such attack.

The exploiting a vulnerability may be applied on any layer of communication

Option (b) may be obtained by causing the modem to ignore some of the communication filters it uses to determine which future packets to pass through (e.g. white list, black list). For example—in some cases the communication may be implemented as a network that has network addresses, and the network commands may include commands that cause the UAV to change the expected network address of the remote controller, and thus it may ignore the communication that has the original network address of the remote controller network ID. In this way the UAV will not process the packets received from its remote controller. Additionally, it may process packets transmitted from the new expected network address of the remote controller which may allow the system to transmit control commands to the UAV and thus to take over the UAV communication.

For example—there may be additional IDs that are used which are more similar to communication ID or pairing ID, a set of bits that are used within the data transmitted, e.g. by being used for scrambling the communication or by just preceding the actual command field of the communication. There may be commands that can cause the UAV to change this communication ID or pairing ID which will cause the UAV to ignore future communication from its original remote controller and may allow the system to transmit control commands to the UAV and thus to take over the UAV communication.

Referring to option (c)—in many cases, the raw message or data sent from the UAV or from the remote controller goes through several processing stages before being transmitted. Such stages are usually meant to create some redundancy so that the original message can be decoded on the other side of communication (through error correction coding or other methods), to be hidden from eavesdropping (e.g. through encryption), to be more balanced, or for other reasons. There may be several system commands that are not supposed to be transmitted or received in usual communication terms, that can disable some of these stages of processing. They may exist for engineering debugging or monitoring reasons. If such packets are transmitted to the UAV or remote controller, they can cause it to transmit with those stages disabled during regular flight. In the usual case this may cause the connection between UAV and remote controller to disconnect or to contribute to the ability to take over the communication or to be able to command the UAV to perform other actions (e.g. return home, land).

Referring to option (d)—in many cases, and in order to prevent cases when a remote controller influences the wrong UAV, a remote controller will be able to control a UAV only after they are "paired". Pairing is a process where the remote controller and the UAV exchange information and set several communication parameters which will normally later influence the communication itself. This can influence the physical layer (e.g. hopping sequence etc.), wrapper layers (e.g. error correction, scramblers, etc.), data in header (e.g. network ID), message payloads and more. A pairing sequence happens when the user desires to pair a certain remote controller with a certain UAV. In the usual case the user initiates this by pressing a physical button on the devices, but sometimes it is initiated by software or application, or by moving the devices in a certain pattern. In some cases, there is a message that can be packed in a packet which will initiate such sequence and when that sequence is initiated, a third party may intervene and take over the communication channel or prevent the remote controller to respond to that pairing sequence and hence cause the UAV and the remote controller to disconnect from each other.

Referring to option (e)—one of the methods that can be used in order to disconnect the UAV from its remote controller or fully take over the communication is to cause the UAV to change some of its communication parameters. As those communication parameters are predefined between the remote controller and the UAV, either by user definition or by a pairing or a handshake process, the UAV and the remote controller expect each other to transmit according to those parameters. However, in many cases, there are communication commands that modify these parameters, and these can be transmitted by the system to the UAV. In some cases, there is no protection mechanism against such attacks, and a plain transmission can use change those parameters, and at other times the transmission has to fully abide to some rules, coding, error correction, encryption, or other layers of rules. If the transmission by the system is received by the UAV, it may change those parameters and hence expect the remote control to transmit according to the new parameters. As the remote controller is not necessarily aware of such change, it will continue to transmit according to the old parameters and hence its transmission will not be received or will be filtered out by the UAV. This will cause a disconnection between the remote controller and the UAV. In case the system does transmit control packets according to the new parameters, it can take over the communication of the UAV. Any of the aforementioned parameters, and additional communication parameters, can be the source of mismatch between the UAV and the remote controller.

In some cases, these commands can be transmitted when the remote controller is not transmitting. In other cases, there should be a transmission by the system that is received with more power than the original remote controller is received (link budget).

In some cases, there is a cascade of commands whereas the first commands may cause some mismatch between the remote controller and the UAV, and the later commands may cause the UAV to perform flight (navigation) commands.

Referring to option (f)—it may be obtained in method that may be similar to the methods mentioned in relation to previous options—but the effect is that the UAV stops transmitting response packets ("ack") and the remote controller may determine that the UAV is not receiving its transmissions (as there is no response) and to disconnect following this. There are many modifications that may cause this effect some of them may be available in a UAV.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for inducing a disruption to an operation of an unmanned aerial vehicle (UAV) that communicates with a remote controller, said method comprising:
   determining to induce the disruption to the operation of the UAV; wherein the determining is based on one of (a) a knowledge of a root cause of the malfunction of the unit, (b) a location of the remote controller, and (c) a distance between the remote controller and the UAV; and
   transmitting, to the UAV, one or more disrupting commands that once executed by the at UAV causes a unit of the UAV to malfunction, the malfunction induces the disruption to the operation of the UAV.

2. The method according to claim 1, wherein the unit of the UAV is a communication unit of the UAV.

3. The method according to claim 1, wherein the unit is a modem of the UAV.

4. The method according to claim 1, wherein the unit is a controller of the UAV.

5. The method according to claim 1, wherein the unit is a sensor of the UAV.

6. The method according to claim 1, wherein the unit is a power supply unit of the UAV.

7. The method according to claim 1, wherein the unit is a telemetry unit of the UAV.

8. The method according to claim 1, wherein the unit is a battery module of the UAV.

9. The method according to claim 1, wherein the unit is a storage unit of the UAV.

10. The method according to claim 1, wherein the malfunction comprises failing to detect objects sensed by the UAV.

11. The method according to claim 1 wherein the transmitting of the one or more disrupting commands comprises transmitting multiple disrupting commands at multiple points in time, wherein at least one disrupting command differs from at least one other disrupting command.

12. The method according to claim 1 wherein the disruption to the operation of the UAV comprises changing a network address of the remote controller.

13. The method according to claim 1 wherein the disruption to the operation of the UAV comprises changing a network address of the remote controller to a network address dictated by the one or more disruption commands.

14. The method according to claim 1 comprising determining the one or more disrupting commands based on the knowledge of the root cause of the malfunction of the unit.

15. The method according to claim 1 comprising determining the one or more disrupting commands based on the location of the remote controller.

16. The method according to claim 1 comprising determining the one or more disrupting commands based on the distance between the remote controller and the UAV.

17. A method for inducing a disruption to an operation of an unmanned aerial vehicle (UAV) that communicates with a remote controller, said method comprising: determining to induce the disruption to the operation of the UAV; and transmitting, to the UAV, one or more disrupting commands that once executed by the at UAV causes a unit of the UAV to malfunction, the malfunction induces the disruption to the operation of the UAV; wherein the malfunction comprises transmitting information from the UAV, in contrary to transmission constraints imposed by the UAV during non-test flight.

* * * * *